Dec. 23, 1952     R. K. LOWMAN     2,622,892
DETACHABLE TRAILER HITCH
Filed Nov. 13, 1951
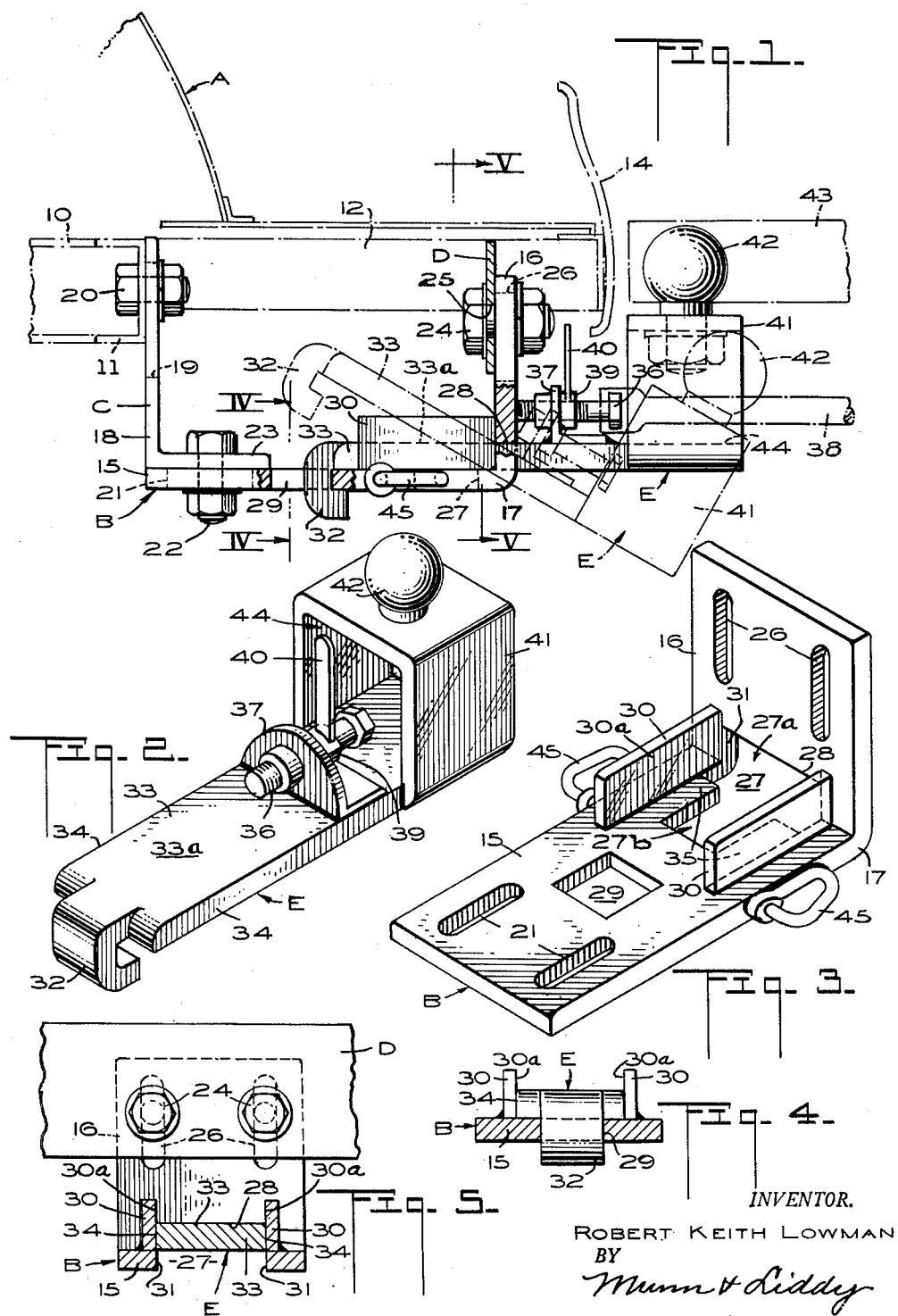
INVENTOR.
ROBERT KEITH LOWMAN
BY
Munn & Liddy
ATTORNEYS Patented Dec. 23, 1952

2,622,892

UNITED STATES PATENT OFFICE 2,622,892

DETACHABLE TRAILER HITCH

Robert Keith Lowman, Oroville, Calif.

Application November 13, 1951, Serial No. 256,077

5 Claims. (Cl. 280—33.44)

The present invention relates to improvements in a detachable trailer hitch, which is intended for coupling towing and towed vehicles together. It embodies structural improvements over the "Draft Device for Trailer Hitch," as disclosed in my United States Letters Patent No. 2,554,711, dated May 29, 1951.

In the above-identified patent, I illustrate a so-called "permanent" bar, which is adapted to be secured to a pair of transverse frames of an automobile, or the like. However, late models of these automobiles are being manufactured with one of the transverse frames omitted. Accordingly, this change in design has required modifications of my hitches so that they may be attached to practically all makes of automobiles, both earlier and later models.

Moreover, the foregoing mentioned patent discloses cams for holding a removable bar in engagement with the permanent bar, preventing chattering therebetween. Under certain conditions of load strain, experience has shown that a more positive means should be employed for maintaining these two bars in coupled relation, overcoming any tendency for the bars to become disconnected, even under severe conditions of stress and vibration.

Therefore, as the cardinal object of this invention, I propose to provide a detachable trailer hitch that has substantially universal adaptation to automobiles, the hitch being made to guard against any accidental detachment during use. Further, I propose to provide a hitch of the character described, which is reinforced in a suitable manner so as to produce a rugged and sturdy device.

Other objects and advantages will appear as the specification continues. The novel features will be set forth in the claims hereunto appended.

Drawing

For a better understanding of the invention, reference should be had to the accompanying drawing, forming part of this application, in which:

Figure 1 is a side elevational view of my detachable trailer hitch, partly in section, and illustrating fragmentary parts of a towing vehicle in dot-dash lines;

Figures 2 and 3 are isometric views of the removable bar and the draw-bar, respectively, forming the two main components of the trailer hitch;

Figures 4 and 5 are vertical transverse sectional views taken along the planes IV—IV and V—V, respectively, of Figure 1.

While I have shown only the preferred form of my invention, it should be understood that various changes, or modifications, may be made within the scope of the annexed claims without departing from the spirit thereof.

Detailed description

Referring to the drawing, I have shown fragmentary portions of a towing vehicle indicated generally at A. As illustrated, this vehicle includes longitudinally-extending main frames 10, which are interconnected by a transverse frame 11. Extensions 12 are fastened to the main frames so as to project rearwardly therefrom, and a bumper 14 is supported at the back of these extensions. Conventional automobiles include the foregoing structural features, and they are set forth by way of example only.

As part of my improved trailer hitch, I provide a draw-bar designated at B. This bar is angle-shaped, providing horizontal and vertical legs 15 and 16, respectively, which define a junction 17 therebetween. While the draw-bar is carried by the vehicle, it is concealed from view so as to not detract from the general appearance of the vehicle.

For supporting the draw-bar B on various sizes and types of vehicles, I make use of an angle bracket C, which is disposed at the forward end of the draw-bar. The vertical leg 18 of this bracket has slots 19 therein. Bolts 20 pass through these slots, and also through openings in the transverse frame 11, thus allowing the bracket to be raised or lowered to meet requirements of installing the trailer hitch.

It will be noted from Figures 1 and 3 that the forward end of the draw-bar B is slotted, as at 21, and bolts 22 are inserted through these slots to extend through openings in the horizontal leg 23 of the bracket C. Thus, this draw-bar may be adjusted forwardly, or rearwardly, and thereafter secured in place.

In order to support the rear portion of the draw-bar B, a transverse strip D is anchored to the extensions 12 previously mentioned. The vertical leg 16 of the draw-bar may be arranged forwardly or rearwardly of the strip D. Bolts 24 extend through openings 25 in this strip, and further pass through slots 26 formed in the vertical leg 16 in the manner illustrated.

In Figures 1, 3 and 5, I show the draw-bar as being fashioned with a substantially T-shaped slot 27 in the region of its junction 17. The transverse portion 27a of this T extends into both the horizontal and vertical legs 15 and 16, respectively, while the stem 27b of the T extends forwardly into the horizontal leg 15. Moreover, the vertical leg 16 defines a horizontal wall 28 at the top of its slot portion 27a, while a hook-receiving opening 29 is provided in the leg 15 of the draw-bar ahead of the junction slot.

As a further structural feature, the draw-bar B has parallel spaced-apart members 30 welded to both the legs 15 and 16 to provide reinforcing gussets at the junction thereof. As disclosed in Fig. 3, the members 30 are arranged laterally beyond the horizontally slot portion 27b. The inner confronting faces 30a of these members are disposed flush with the end walls 31 of the transverse slot portion 27a (see Figure 5) for the purposes hereinafter described.

The second principal component of my trailer hitch constitutes a removable bar indicated generally at E having a hook 32 depending from its forward end. This bar is adapted to be inserted through the draw-bar slot 27 so as to overlap the horizontal leg 15, as shown in Figure 1. During the introduction of the bar E, the hook 32 passes through the slot portion 27b, while the main part 33 of the removable bar is made for passage through the slot portion 27a.

In Figure 1, I show the removable bar E in dot-dash lines as being inclined upwardly and forwardly as it is advanced through the slot 27. The width of the main part 33 of the removable bar is coextensive with the distance between the confronting faces 30a of the members 30, as clearly shown in Figure 5. Accordingly, the members 30 will abut opposing longitudinal sides 34 of the removable bar to guide and preclude the latter from shifting laterally relative to the draw-bar B during and following the coupling of the bars together.

After the bar E has been inserted the necessary distance, it may be swung into a horizontal position, with the hook 32 entering the opening 29, as illustrated in full lines in Figure 1. Next, this bar is retracted rearwardly a slight distance to engage the hook with the draw-bar. At this time, the horizontal wall 28 provided at the top of the slot portion 27a will bear against the top surface 33a of the bar part 33 to prevent the latter from moving upwardly. Of course, the members 30 and the end walls 31 preclude the removable bar E from shifting sidewise when the bars B and E are interconnected.

Inasmuch as the width of the slot portion 27b is less than the width of the bar part 33, sections 35 of the draw-bar (see Figure 3), which border this slot portion, will project underneath and support the removable bar E when the two bars are coupled together.

For the purpose of retracting the removable bar E relative to the draw-bar B, and maintaining them in coupled relation, I make use of a bolt 36, which is threaded through a bracket 37 fixed to and carried by the bar E rearwardly of the vertical leg 16 of the draw-bar. This bolt extends lengthwise relative to the bar part 33, and is disposed to bear against the leg 16 for retracting the bar E into a position to engage the hook 32 with the draw-bar upon tightening that bolt.

As suggested in Figure 1, a wrench 38 may be applied to this bolt for tightening or loosening the latter. In order to secure the bolt 36 in adjusted position, I make use of a lock nut 39, which is threaded onto the bolt so that it may be tightened up against the bracket 37. Figures 1 and 2 disclose a handle 40, which is fixed to and projects from this lock nut rearwardly of the vertical leg 16 of the draw-bar so as to be accessible.

It will be noted that the removable bar E is provided at its trailing end with an upstanding tongue-securing bracket 41. This bracket carries a ball 42 at its top to which a tongue 43 of a towed vehicle may be coupled in the usual manner. As shown in Figures 1 and 2, the bracket 41 has an opening 44 therein through which the wrench 38 may be inserted for turning the bolt 36. Eyelets 45 may be anchored to the draw-bar B. Safety chains (not shown) may be connected to these eyelets and to the draft tongue 43 as a precautionary measure.

Some makes of vehicles now on the market have the license plate thereof mounted in the center of the bumper 14. It is quite apparent that the various adjustments of my trailer hitch will allow the ball 42 to be positioned below such a license plate so that the latter will not be obscured.

*Summary*

In attaching my trailer hitch to the vehicle A, the angle-bracket C is secured to the transverse frame 11 by the bolts 20, as shown in Figure 1. Moreover, the bolts 22 are utilized for mounting the forward end of the draw-bar B to the horizontal leg 23 of the bracket C. In a similar manner, the bolts 24 are inserted through the strip D and the vertical leg 16 of the draw-bar. The slots 19, 21 and 26 will permit the draw-bar B to be adjusted into the proper position with respect to the frame members of the vehicle.

Next, the forward end of the removable bar E is inserted forwardly and upwardly through the slot 27 of the draw-bar, as suggested by the dot-dash lines in Figure 1. Thereafter, the draw-bar is swung into horizontal position, with the hook 32 thereof entering the opening 29. Now the wrench 38 is introduced through the opening 44 provided in the upstanding tongue-securing bracket 41, and the bolt 36 is tightened by the wrench so as to retract the bar E relative to the bar B until the hook 32 is firmly engaged with the draw-bar. At this time the handle 40 is swung so as to turn the lock nut 39 and clamp the bolt 36 in its adjusted position.

Now the tongue 43 of a vehicle to be towed may be coupled to the ball 42, which is mounted on the top of the bracket 41. As previously explained, safety chains may be placed between the tongue 43 and the eyelets 45 on the draw-bar B.

It is a simple operation to disengage the removable bar E from the draw-bar B, leaving the latter secured to the towing vehicle. This is accomplished by merely releasing the lock nut 39, loosening the bolt 36 with the wrench 38, pushing the bar E forwardly a slight distance until its hook 32 clears the opening 29, and then retracting the bar E until it is withdrawn from the slot 29 of the draw-bar.

I claim:

1. In a detachable trailer hitch: an angle-shaped draw-bar providing horizontal and vertical legs, which define a junction therebetween; means for securing the draw-bar to a vehicle; this bar being fashioned with a slot in the region of its junction extending into both legs thereof; a removable bar insertable through the draw-bar slot to overlap said horizontal leg; the removable bar having a hook thereon; the draw-bar being made with an opening in its horizontal leg disposed to have the hook engage therein to limit retraction of the removable bar relative to the draw-bar; the vertical leg of the draw-bar defining a horizontal wall at the top of its slot portion, which is disposed to bear against the removable bar to prevent the latter from moving upwardly when the hook is secured in said opening of the horizontal leg; and a threaded bolt rotatably carried by the removable bar rearwardly of said vertical leg, and arranged to bear against this leg for retracting the removable bar into a position to maintain its hook in engagement with the draw-bar.

2. The combination as set forth in claim 1, in which a tongue-securing bracket is provided on the removable bar; this bracket having an opening therein through which a wrench may be inserted for turning the bolt.

3. The combination as set forth in claim 1, in which a lock nut is provided on the bolt for securing the latter in adjusted position; this nut having a handle projecting therefrom rearwardly of the vertical leg of the draw-bar.

4. In a detachable trailer hitch: an angle-shaped draw-bar providing horizontal and vertical legs, which define a junction therebetween; means for securing the draw-bar to a vehicle; this bar being fashioned with a slot in the region of its junction having portions of the slot extending into both legs thereof; a removable bar insertable through the draw-bar slot to overlap said horizontal leg; the removable bar having a hook dimensioned for passing through the portion of the slot in said horizontal leg; the width of the removable bar being made for passage through the slot portion in said vertical leg; the draw-bar having an opening in its horizontal leg disposed to have the hook engaged therein to limit retraction of the removable bar relative to the draw-bar; said vertical leg defining a horizontal top wall at the top of its slot portion, which is disposed to bear against the removable bar to prevent the latter from moving upwardly when the hook is secured in the opening of said horizontal leg; means carried by the removable bar and operable against said vertical leg for retracting the removable bar into a position to maintain its hook in engagement with the draw-bar; and spaced-apart members secured to the draw-bar so as to abut opposing longitudinal sides of the removable bar to guide and preclude the latter bar from shifting laterally relative to the draw-bar during and following the coupling of the bars together.

5. The combination as set forth in claim 4, in which the spaced-apart members are fixed to both the horizontal and vertical legs of the draw-bar to provide reinforcing gussets at the junction therebetween.

ROBERT KEITH LOWMAN.

REFERENCES CITED

The following references are of record in the file of this patent:

UNITED STATES PATENTS

| Number | Name | Date |
| --- | --- | --- |
| 2,554,711 | Lowman | May 29, 1951 |